United States Patent Office 3,458,716
Patented July 29, 1969

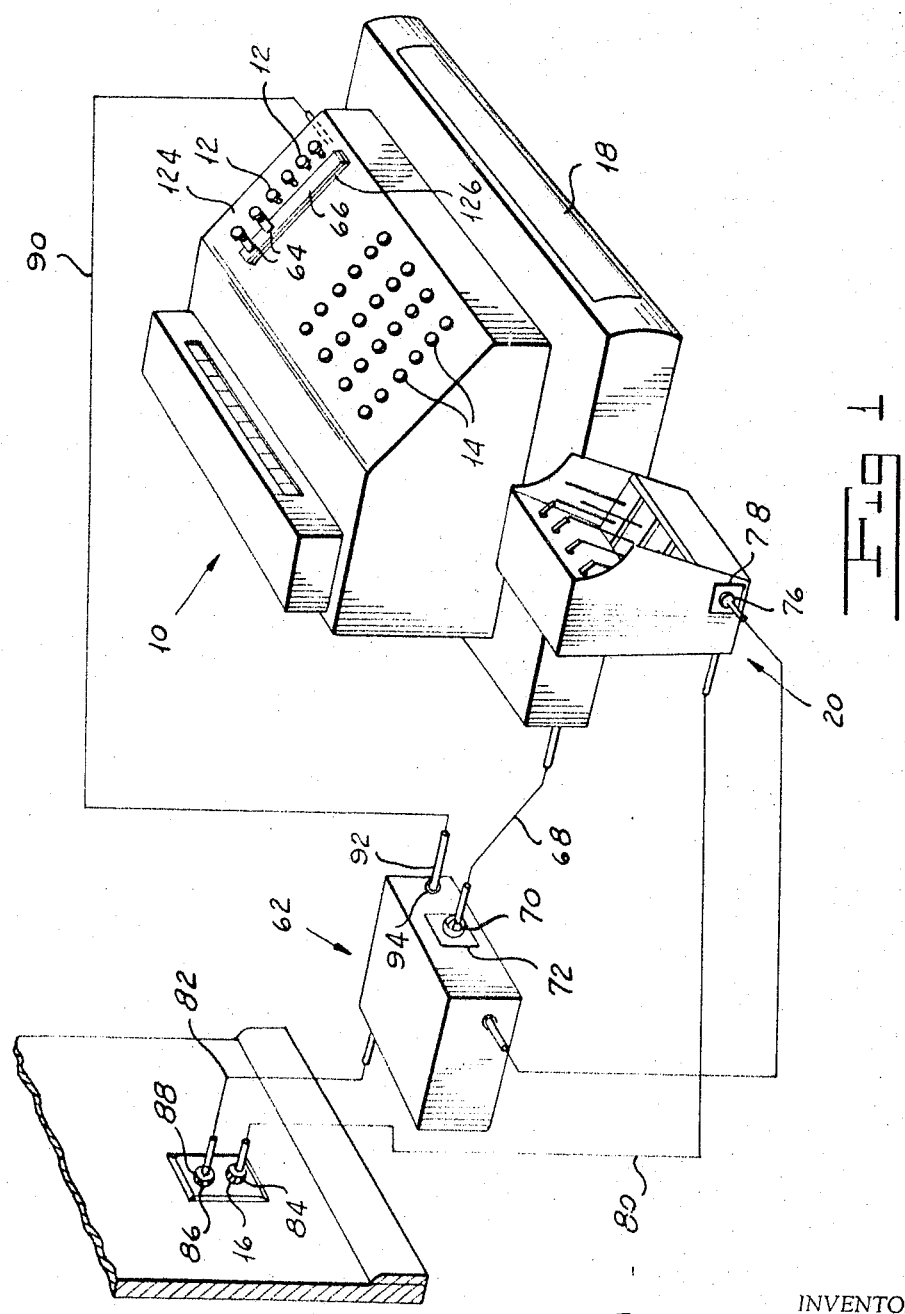

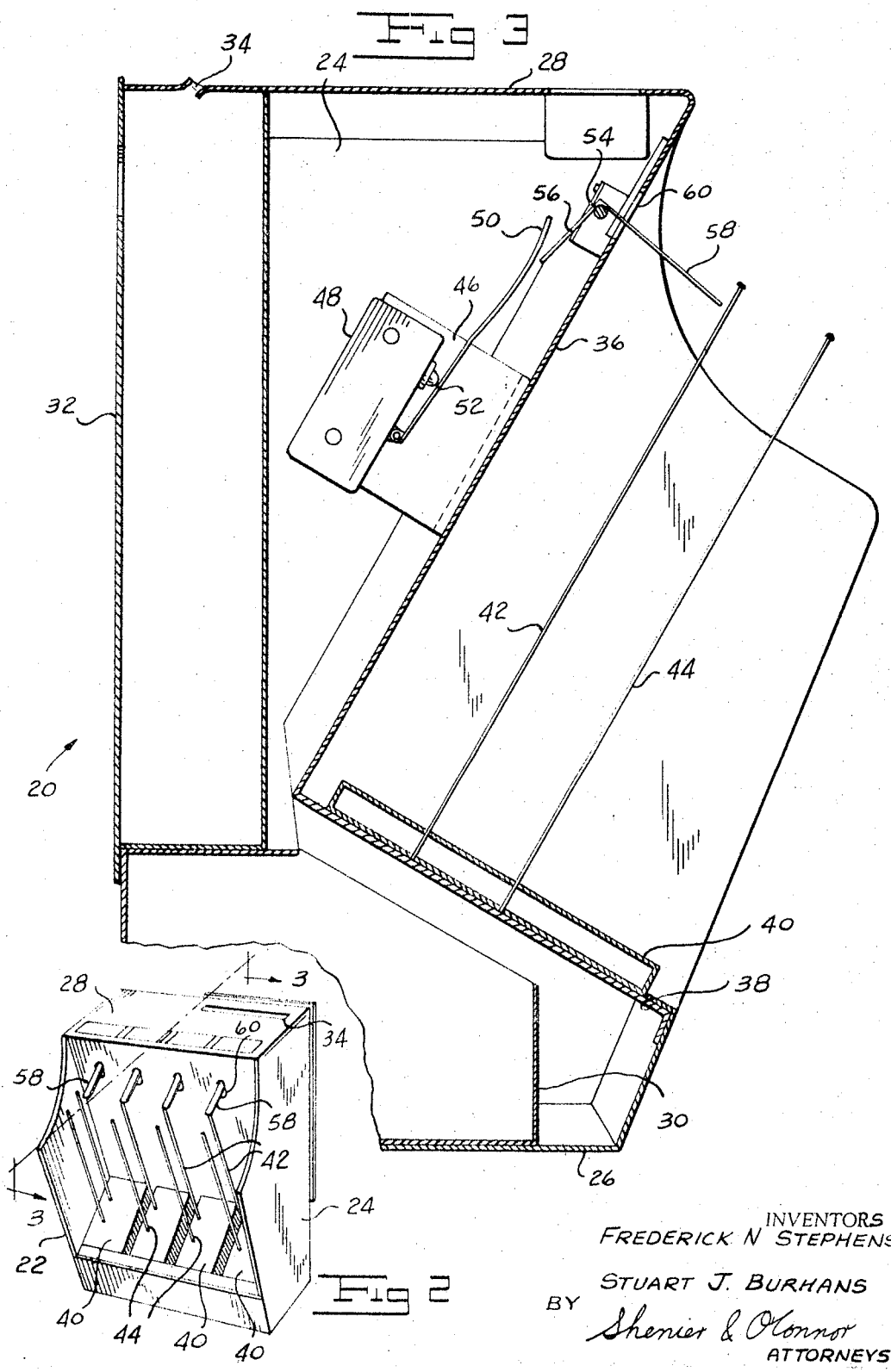

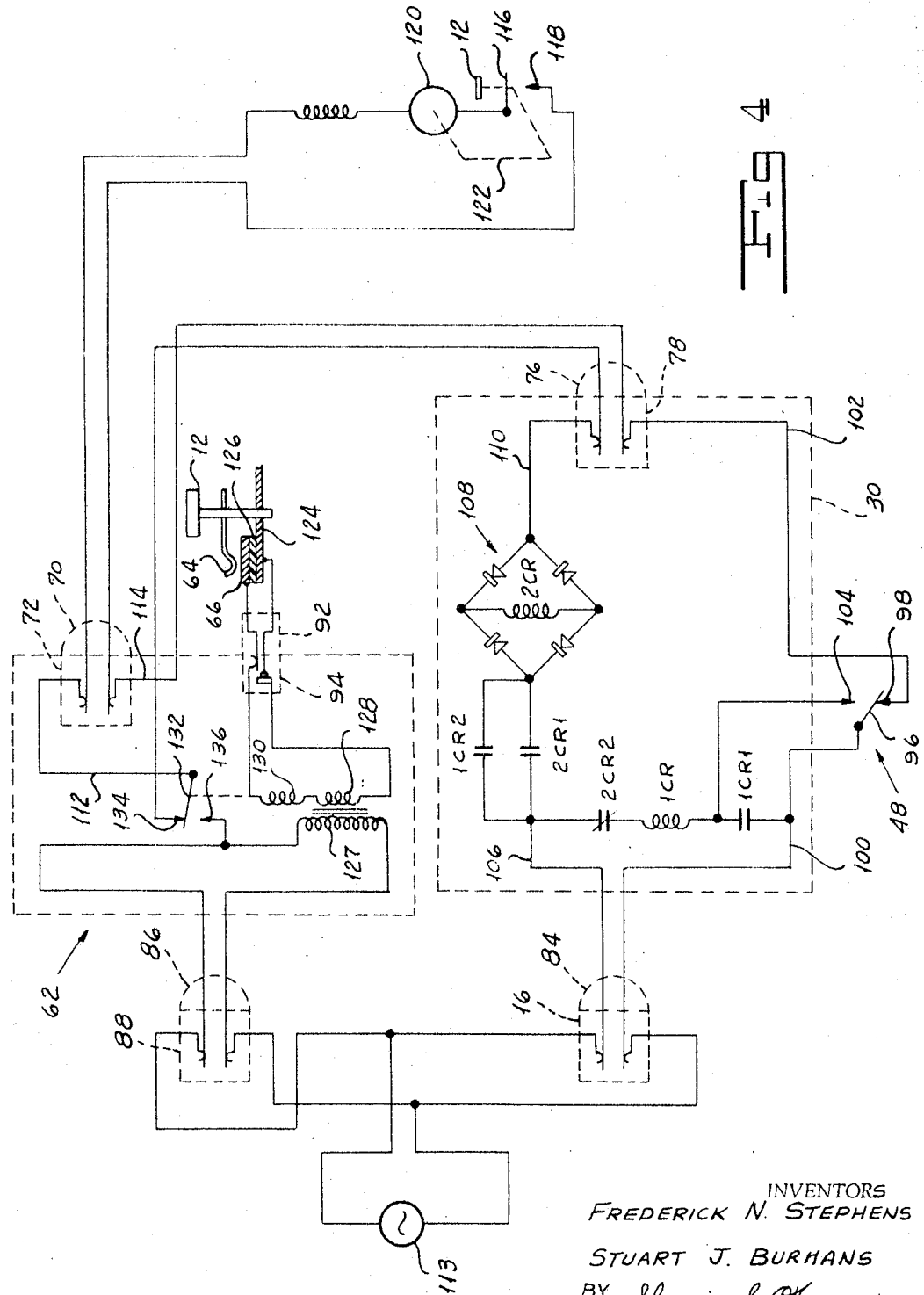

1

3,458,716
INVENTORY CONTROL DEVICE
Frederick N. Stephens, Leawood, Kans., and Stuart J. Burhans, Kansas City, Mo., assignors to Stephens Industries, Inc., Kansas City, Mo., a corporation of Missouri
Filed Nov. 13, 1964, Ser. No. 411,014
Int. Cl. H01h *35/00;* H02b *1/24*
U.S. Cl. 307—116                                                9 Claims

ABSTRACT OF THE DISCLOSURE

An inventory control system in which a normally open switch in one line between a power source and the cash register is closed in response to movement of a ticket actuated switch arm from a normally engaged contact to a normally disengaged contact in response to passage of a ticket by a pivoted flap. Upon return of the ticket actuated switch to its normally engaged contact, the circuit of the register is conditioned to operate. In response to operation of a cash register key corresponding to a nonticketed department, the collector circuit is bypassed.

---

Our invention relates to an inventory control device and more particularly to an improved device for use in conjunction with a cash register to ensure collection of inventory control tickets for a ticketed department while permitting expeditious use of the cash register for departments in which no tickets are used.

In order to control accurately the inventory in department stores, many departments employ tickets which are separably attached to the articles of merchandise. When a sale is recorded in such a department the cash register operator must collect the ticket so that an accurate record may be kept of the articles of merchandise which are sold. The copending application of Frederick N. Stephens and Joseph R. McBride, Ser. No. 238,963 filed Nov. 20, 1963, now Patent 3,263,100, for a Ticket Collector discloses an adjunct to a cash register which prevents operation of the register until a ticket has been deposited in the collector box. Specifically, in response to the insertion of a ticket into a slot in the cover of the box a switch is actuated to free the register for operation.

While inventory control tickets are employed in many departments of a store, such a system of inventory control is not practicable for other departments which may be termed "unticketed" departments. Obviously while no tickets may be provided for such departments it is necessary that sales in those departments be registered. In order to permit operation of the register to record a sale in an unticketed department, it has been suggested that a push button or some manually operable switch be provided on the ticket collector disclosed in the copending application to bypass the collector circuitry. While such an arrangement permits use of the register to record sales in unticketed departments, it entails an additional operation on the part of the operator.

As has been pointed out hereinabove, in the ticket collector disclosed in the copending application insertion of a ticket into the collector box actuates a switch to enable the register. While that arrangement operates satisfactorily in most instances, the possibility exists that a ticket inserted in the box may become "hung up" on the flap or the like which operates a switch. Such an event disables the mechanism and the register until the ticket has in some way been pushed past the flap.

We have invented an improved inventory control device which overcomes the defects of ticket collector devices of the type described above. Our improved device

2 readily permits operation of the register for a ticketed department without entailing an additional manual operation. It prevents operation of the register for a ticketed department until the ticket has been moved completely past the switch actuator. It facilitates the operation of moving the ticket past the switch actuator to enable the register. Our improved inventory control device is simple and inexpensive for the result achieved thereby.

One object of our invention is to provide an improved inventory control device for ensuring the collection of inventory control tickets as sales are registered.

Another object of our invention is to provide an improved inventory control device which permits operation of the cash register for an unticketed department without necessitating an additional manual operation.

A further object of our invention is to provide an improved inventory control device which ensures that tickets being collected are moved completely past the switch actuating member.

A still further object of our invention is to prevent disabling of the register by tickets which are "hung up" on the actuating element.

Yet another object of our invention is to provide a simple and inexpensive inventory control device.

Other and further objects of our invention will appear from the following description.

In general our invention contemplates the provision of an inventory control system comprising a ticket collector circuit having an actuatable, normally open switch in one line between a power source and the cash register. In response to placement of a ticket in the collector, a ticket responsive switch moves from a position at which it closes the other cash register line to a second position at which the normally open switch is actuated and held. When the ticket actuated switch is released it returns to the first position to enable the cash register to operate. In response to actuation of a cash register key corresponding to a non-ticketed department, the collector circuit is automatically bypassed.

In the accompanying drawings which form part of the instant specification and which are to be read in conjunction therewith and in which like reference numerals are used to indicate like parts in the various views:

FIGURE 1 is a perspective view illustarting the association of the various units of our system with a cash register with which they are used.

FIGURE 2 is a perspective view of the ticket collector portion of our inventory control system.

FIGURE 3 is a sectional view of the ticket collector of our inventory control system taken along the line 3—3 of FIGURE 2 and drawn on an enlarged scale.

FIGURE 4 is a schematic view illustrating one form of electrical circuit which can be used with our inventory control system.

Referring now to FIGURE 1, our inventory control system is adapted to be used with a cash register indicated generally by the reference character 10 of a suitable type known to the art provided with a column of keys 12 corresponding to various merchandising departments. Other keys 14 of the register correspond to various prices. As is known in the prior art, cash registers such as the register 10 when connected to the outlet 16 of a suitable source of power and in response to the concomitant operation of appropriate keys 14 and a key 12 registers the sale and causes the till 18 to open to permit money to be deposited in the register and to permit change to be made. Moreover, the electrical circuit which had been completed upon actuation of a key such as the key 12 is interrupted when the drawer opens and the key is released. The register is set for the next operation when the drawer or till 18 is reclosed.

As has been explained hereinabove, in many departments of a store inventory control tickets are applied to the various items being sold. In order that a running inventory be accurately kept it is desirable that the inventory control tickets be retained and sorted by the operators of the cash registers as the items are sold. Under the press of business it has been discovered that cashiers normally do not, in all instances, remember to retain the inventory control ticket and no accurate record thus is possible. Our inventory control system includes a ticket collector indicated generally by the reference character 20 for preventing the cashier from ringing up a sale in a ticketed department unless she has placed the inventory control ticket in the collector 20.

Referring now to FIGURES 1 to 3, our ticket collector 20 has side walls 22 and 24 carried by a base 26 and a top 28. We mount a sub-housing 30 between the side walls 22 and 24 and dispose the electrical elements to be described hereinafter of the collector within housing 30. We mount a return box 32 between the walls 22 and 24 over the sub-housing 30. Slot 34 formed in the top 28 permits "no sale" tickets to be deposited in the box 32. A bracket 36 supported between the walls 22 and 24 has a downwardly and forwardly extending base 38 carrying a plurality of platforms 40 through which respective pairs of aligned spindles 42 and 44 extend in positions to receive tickets provided with holes corresponding to the spacing of the spindles 42 and 44.

Each pair of spindles 42 and 44 corresponds to a particular department, the articles of merchandise of which carry inventory tickets. It will readily be appreciated that this arrangement facilitates separation of the tickets by department as they are collected. For example, in the specific form of our improved collector shown in the drawing, there are four pairs of spindles 42 and 44 corresponding to four ticketed departments.

A bracket 46 mounted on the bracket 36 carries a microswitch 48 having an actuable arm 50 adapted to be moved to operate the switch button 52. As is known in the art the arm 50 normally occupies the position shown in FIGURE 3. A shaft 54 rotatably supported inside the bracket 36 carries for rotation therewith a flap 56 and a plurality of arms 58 spaced along the length of shaft 54 and extending outwardly through openings 60 in the bracket 36 at locations corresponding to the locations of the pairs of spindles 42 and 44. Thus as a ticket is placed on a pair of spindles 42 and 44, an arm 58 rotates shaft 54 in a clockwise direction as viewed in FIGURE 3 to cause the flap 56 to move arm 50 in a counterclockwise direction to operate button 52. It will readily be appreciated that after the ticket has passed completely by the arm 58, that arm and the switch will return to their initial positions.

Our system includes a housing indicated generally by the reference character 62 containing circuitry for by-passing the collector 20 when a key 12 corresponding to an unticketed department is actuated. The circuitry within the housing 62 is actuated in a manner to be described in response to the operation of a key 12 carrying a conductive finger 64 which engages a conductive strip 66 when the key is pressed. The keys 12 corresponding to ticketed departments do not carry fingers 64. Before describing the electrical circuitry of our system we will point out one way in which the cash register, the collector 20 and the unit 62 may be interconnected. The cord 68 of the register carries a plug 70 adapted to be inserted in a suitable receptacle 72 of the housing 62. A cord 74 leading from the unit 62 carries a plug 76 adapted to be inserted into a receptacle 78 of the unit 20. The collector 20 and the unit 62 have respective cords 80 and 82 carrying plugs 84 and 86 adapted to be inserted into power outlet receptacles such, for example, as the receptacle 16 and a receptacle 88. A cord 90 carries a plug 92 adapted to be inserted into a jack 94 of the unit 62 to actuate that unit in a manner to be described when a key 12 carrying a finger 64 is operated.

Referring now to FIGURE 4, we have designated the plugs and receptacles by the same reference numerals as are used to indicate these elements in FIGURE 1 of the drawings. Switch 48 which is actuated in response to deposit of a ticket on spindles 42 and 44 includes a contact arm 96 which normally engages a contact 98 to connect one of the conductors 100 leading from plug 84 to one of the conductors 102 leading to receptacle 78. In response to actuation of the switch 48 arm 96 moves momentarily into engagement with a contact 104 and then returns to contact 98. We connect a normally open relay switch 1CR1, a relay winding 1CR and a normally closed relay switch 2CR2 in series between conductor 100 and the other conductor 106 leading from plug 84. We connect a normally open relay switch 1CR2 in series with a full wave rectifier indicated generally by the reference character 108 between the conductor 106 and the other conductor 110 leading to the receptacle 78.

The conductors leading to the receptacles 16 and 88 are connected in parallel across a suitable source 113 of alternating current. We connect a normally open relay switch 2CR1 in parallel with switch 1CR2. The relay winding 2CR associated with switches 2CR1 and 2CR2 is connected across the output terminals of rectifier 108. Contact 104 is connected to the common terminal of switch 1CR1 and winding 1CR.

From the structure just described it will be apparent that when a ticket is placed on a pair of spindles 42 and 44, an arm 58 is operated to move flap 56 into engagement with arm 50 to operate button 52 to move arm 96 into engagement with contact 104. This operation completes the circuit of winding 1CR from conductor 106, through normally closed switch 2CR2, through winding 1CR and through contact 104 of arm 96 to conductor 100. Energization of winding 1CR closes switch 1CR1 to provide a holding circuit for the winding and closes switch 1CR2 to complete a circuit from conductor 106 through the rectifier 108 to conductor 110. When arm 96 returns to contact 98 the circuit from conductor 106 to conductor 110 remains complete and the circuit from conductor 100 to conductor 102 is completed so that power is available in the receptacle 78.

We connect the conductors leading from plug 76 to respective conductors 112 and 114 of receptacle 72 which receives the cash register plug 70. With the elements of our circuit in the condition just described when a key 12 corresponding to a ticketed department is actuated it moves a switch arm 116 into engagement with a contact 118 to complete the circuit of the register drive motor 120. As is known in the art upon its actuation key 12 is locked in position until motor 120 completes its operation at which time the key is released by a linkage indicated by the broken line 122 in FIGURE 4.

When the motor circuit is complete in the manner just described, power is drawn from receptacle 16 through the collector circuitry in housing 30 through plug 76 to receptacle 72 and to the register. When this occurs relay 2CR is energized to open switch 2CR2 to de-energize winding 1CR to open switches 1CR1 and 1CR2 to condition the collector circuitry for the next operation. Winding 2CR also closes switch 2CR1 to hold the cash register circuit until motor 120 completes its operation and moves arm 116 away from contact 118 to de-energize winding 2CR.

As has been explained hereinabove, we arrange our system to permit the register 10 to be operated for a nonticketed department without necessitating any separate manual operation to disable the collector circuitry. The conductive casing 124 of the register 10 carries a strip 126 of a suitable insulating material extending alongside the line of the department keys 12. We mount the conductive strip 66 on the insulating strip 126. We connect the conductors of cord 90 respectively to the strip 66 and to the casing 124. We connect the primary winding 127 of a stepdown transformer across the conductors leading to plug 86. The secondary winding 128 associated with winding 127 is connected in series with a relay winding 130 across the conductors leading to the receptacle 94. Relay 130 when energized moves a switch arm 132 normally in engagement with a contact 134 leading to a conductor of plug 86 into engagement with a contact 136.

When a key 12 corresponding to a nonticketed department is actuated, the associated contact arm 64 engages the strip 66 to complete a circuit from strip 66 through the contact 64 and through the shank of the key to the case 124. Thus, the circuit of winding 130 is complete and a winding is energized to move arm 132 out of engagement with contact 134 and into engagement with the contact 136. This operation connects the conductor 112 through plug 86 and receptacle 88 to the same line of source 112 as that to which conductor 112 would be connected upon operation of the collector circuit. Conductor 114 remains connected to the other line of source 112 through switch arm 96 and plug 84. In this manner power is available at plug 70 and the register operates without the necessity of placing a ticket in the collector 20. When the register operation is complete, the key 12 having the arm 64 is released and the register circuit is disabled. It will readily be apparent that when a key 12 associated with a nonticketed department is operated to engage contact 64 with strip 66, the associated arm 116 concomitantly moves into engagement with the corresponding contact 118 to operate the register.

The operation of our inventory control device will readily be apparent from the description given hereinabove. In order to register a sale in a ticketed department, before the register can be operated, a merchandise ticket must be inserted in the collector 20 first to move arm 96 into engagement with contact 104 to energize 1CR. Moreover, the ticket must be moved completely past the sensing arm 58 so that arm 96 returns to contact 98. Then the register may be operated in the manner described. For a nonticketed department, the operator actuates a register key 12 carrying a contact 64 and the circuit of the register is at once complete with the circuitry of the collector which requires insertion of a ticket bypassed. Upon completion of the registry cycle the system is automatically reset.

It will be seen that we have accomplished the objects of our invention. We have provided an improved inventory control device which ensures collection of inventory control tickets as sales are registered. Our device permits operation of the cash register to register a sale for a nonticketed department without requiring an additional manual operation to bypass the collector circuit. Our improved collector device prevents the register circuit from being disabled by a ticket which is not fully inserted into the collector. Our system is relatively simple and inexpensive for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In an inventory control system for use with a cash register having a conductive casing carrying an operable element associated with a controlled department and another element associated with an uncontrolled department, said register being adapted to be coupled to a source of energy, a first normally open switch connected between one terminal of said source and said register, a second normally open switch connected in parallel with said first normally open switch, a third switch having a contact arm and a pair of contacts, means connecting said one contact arm and one of said contacts between the other terminal of said source and said register, said arm normally engaging said one contact, a pivoted flap for moving said arm from engagement with said one contact into engagement with the other contact, means for guiding an inventory control ticket to pivot said flap, means responsive to engagement of said arm with said other contact for closing said first normally open switch, insulating material on said casing adjacent said elements, conductive material carried by said insulating material, a contact arm carried by said uncontrolled department element, said arm being adapted to engage said conductive material upon operation of said uncontrolled department element and means responsive to engagement of said conductive material by a contact for closing said second normally open switch.

2. In an inventory control system for use with a cash register having an operable element associated with a controlled department and having another operable element associated with an uncontrolled department, said register being adapted to be coupled to a source of energy, a first normally open switch connected between one terminal of said source and said register, a second normally open switch connected in parallel with said first normally open switch, a third switch having a contact arm and a pair of contacts, means connecting said contact arm and one of said contacts between the other terminal of said source and said device, said arm normally engaging said one contact, a winding adapted to be energized to close said first normally open switch, means responsive to energization of said winding for providing a holding circuit therefor, means responsive to engagement of said arm with said other contact for energizing said winding, means responsive to operation of said register for interrupting said holding circuit and means responsive to operation of said uncontrolled department element for closing said second normally open switch.

3. In an inventory control system for use with a cash register having a conductive casing and having an operable element associated with a controlled department and having another operable element associated with an uncontrolled department, said register being adapted to be coupled to a source of energy, a first normally open switch connected between one terminal of said source and said register, a second normally open switch connected in parallel with said first normally open switch, a third switch having a contact arm and a pair of contacts, means connecting said contact arm and one of said contacts between the other terminal of said source and said device, said arm normally engaging said one contact, means responsive to engagement of said arm with said other contact for closing said first normally open switch, insulating material on said casing, conductive material on said insulating material, and a contact arm on said other element for engaging said conductive material and means responsive to engagement of said contact arm with said conductive material for closing said second normally open switch.

4. In an inventory control system for use with a cash register having an operable element associate with a controlled department and having another operable element associated with an uncontrolled department, said register being adapted to be coupled to a source of energy, a first normally open switch connected between one terminal of said source and said register, a second normally open switch connected in parallel with said first normally open switch, a third switch having a contact arm and a pair of contacts, means connecting said contact arm and one of said contacts between the other terminal of said source and said device, said arm normally engaging said one contact, means responsive to engagement of said arm with said other contact for closing said first normally open switch and means responsive to operation of said uncontrolled department element for closing said second normally open switch.

5. In an inventory control system for use with a cash register having an operable element associated with a controlled department and having another operable element associated with an uncontrolled department, said cash register being adapted to be connected to a two terminal source of energy, first normally open switching means connected between one of said terminals and said register, second actuatable two-condition switching means normally connecting the other of said terminals to said device and actuatable to a second condition, means responsive to the second condition of said two-condition switch for closing said normally open switching means and means responsive to operation of said uncontrolled department element for bypassing said normally open switch.

6. In an inventory control system for use with a cash register having a conductive casing carrying certain operable elements associated with controlled departments and other operable elements associated with uncontrolled departments, said elements being disposed generally along a line, said register being adapted to be coupled to a source of energy, means comprising a normally open switch for coupling said register to said source, means responsive to actuation by an inventory control ticket for closing said normally open switch, a strip of insulating material extending alongside said elements on said casing, a strip of conductive material carried by said strip of insulating material, respective contact arms carried by said uncontrolled department elements, said arms being adapted to engage said conductive material upon operation of said uncontrolled department elements and means responsive to engagement of said conductive material by a contact arm for bypassing said normally open switch.

7. In an inventory control system for use with a cash register having a conductive casing carrying certain operable elements associated with controlled departments and other operable elements associated with uncontrolled departments, said register being adapted to be connected to a source of energy, means comprising a normally open switch for coupling said register to said source, means responsive to actuation by an inventory control ticket for closing said normally open switch, insulating material carried by said casing, a conductive element carried by said insulating material, a contact arm carried by one of said other elements, said arm being adapted to engage said conductive element upon operation of said uncontrolled department element and means responsive to engagement of said conductive element by said contact arm for bypassing said normally open switch.

8. In an inventory control system for use with a cash register having certain operable elements associated with controlled departments and having other operable elements associated with uncontrolled departments, said register being adapted to be connected to a source of energy, means comprising a first normally open switch for coupling said register to said source, a pivoted flap for closing said first normally open switch, spaced spindles for guiding an inventory control ticket to pivot said flap to close said switch, a second normally open switch connected in parallel with said first normally open switch, and means responsive to operation of one of said uncontrolled department elements for closing said second normally open switch to bypass said first normally open switch.

9. In an inventory control system for use with a cash register having certain operable elements associated with controlled departments and having other operable elements associated with uncontrolled departments, said register being adapted to be connected to a source of energy, means comprising an actuatable first normally open switch for coupling said register to said source, said switch having an actuating arm, a flap having a pair of arms, guide means for guiding an inventory control ticket manually moved along the guide over a predetermined path, means mounting said flap for pivotal movement adjacent said path with one of said switch arms extending into said path and with the other arm adjacent said switch, said flap pivoting in response to engagement of said one arm by a ticket being moved along said path to cause said other arm to engage said switch actuating arm to enable said certain operable elements, a second normally open switch connected in parallel with said first normally open switch and means responsive to operation of one of said uncontrolled department elements for closing said second normally open switch to bypass said first normally open switch.

References Cited

UNITED STATES PATENTS

| | | | |
|---|---|---|---|
| 2,962,634 | 11/1960 | Griffin | 317—154 X |
| 3,047,218 | 7/1962 | Perry et al. | 235—11 |
| 3,121,189 | 2/1964 | Mills | 317—154 X |
| 3,261,005 | 7/1966 | Shade | 317—154 X |
| 3,263,100 | 7/1966 | Stephens et al. | 307—116 |
| 3,346,779 | 10/1967 | Enk | 317—154 X |
| 3,340,409 | 9/1967 | Probert et al. | 307—115 |

ROBERT K. SCHAEFER, Primary Examiner

T. B. JOIKE, Assistant Examiner

U.S. Cl. X.R.

235—11; 317—137, 154